(12) United States Patent
Zheng

(10) Patent No.: US 10,345,894 B2
(45) Date of Patent: Jul. 9, 2019

(54) SYSTEM AND METHOD FOR IMAGE PROCESSING

(71) Applicant: JRD COMMUNICATION (SHENZHEN) LTD, Shenzhen, Guangdong (CN)

(72) Inventor: Yu Zheng, Guangdong (CN)

(73) Assignee: JRD COMMUNICATION (SHENZHEN) LTD, Shenzhen (CN)

( * ) Notice: Subject to any disclaimer, the term of this patent is extended or adjusted under 35 U.S.C. 154(b) by 0 days.

(21) Appl. No.: 15/569,387

(22) PCT Filed: Dec. 14, 2016

(86) PCT No.: PCT/CN2016/109898
§ 371 (c)(1),
(2) Date: Oct. 26, 2017

(87) PCT Pub. No.: WO2017/219622
PCT Pub. Date: Dec. 28, 2017

(65) Prior Publication Data
US 2018/0224925 A1    Aug. 9, 2018

(30) Foreign Application Priority Data

Jun. 23, 2016   (CN) .......................... 2016 1 0465433

(51) Int. Cl.
*G06F 3/01* (2006.01)
*G06T 11/60* (2006.01)
(Continued)

(52) U.S. Cl.
CPC ................ *G06F 3/011* (2013.01); *G06T 7/20* (2013.01); *G06T 11/60* (2013.01); *G06T 19/006* (2013.01)

(58) Field of Classification Search
CPC .. G06K 9/00664–00704; G06F 3/0481; G06F 3/04817; G06F 9/4443;
(Continued)

(56) References Cited

U.S. PATENT DOCUMENTS

2005/0261980 A1   11/2005  Hadi et al.
2013/0335301 A1   12/2013  Wong et al.
(Continued)

FOREIGN PATENT DOCUMENTS

CN    104750249 A    7/2015
CN    204856380 U   12/2015
(Continued)

OTHER PUBLICATIONS

International Search Report on corresponding PCT application (PCT/CN2016/109898) from International Searching Authority (CN) dated Mar. 27, 2017.

*Primary Examiner* — Todd Buttram

(57) ABSTRACT

The present disclosure provides a system and method for image processing, the method includes: detecting and acquiring actual motion information that a user applies on the virtual reality system or the augmented reality system; dynamically generating an image imposed with an intervention instruction based on the actual motion information and the intervention instruction when receiving the intervention instruction; displaying the image imposed with an intervention instruction, so as to affect and intervene the user's behavior. Through this method, the present disclosure may affect and intervene user's behavior.

6 Claims, 3 Drawing Sheets

(51) Int. Cl.
*G06T 7/20* (2017.01)
*G06T 19/00* (2011.01)

(58) Field of Classification Search
CPC .. G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | |
|---|---|---|
| 2014/0306881 A1 | 10/2014 | Sugihara et al. |
| 2015/0092015 A1 | 4/2015 | Stafford |
| 2015/0277119 A1* | 10/2015 | Wong ................ G02B 27/0093 345/633 |
| 2016/0034042 A1 | 2/2016 | Joo |
| 2016/0070343 A1 | 3/2016 | Li |

FOREIGN PATENT DOCUMENTS

| | | |
|---|---|---|
| CN | 105630164 A | 6/2016 |
| CN | 105700686 A | 6/2016 |

\* cited by examiner

SYSTEM AND METHOD FOR IMAGE PROCESSING

CROSS-REFERENCE TO RELATED APPLICATIONS

The present application is a 35 U.S.C. § 371 National Phase conversion of International (PCT) Patent Application No. PCT/CN2016/109898, filed on Dec. 14, 2016, which claims foreign priority of Chinese Patent Application No. 201610465433.3, filed on Jun. 23, 2016 in the State Intellectual Property Office of China, the contents of all of which are hereby incorporated by reference.

TECHNICAL FIELD

The present disclosure generally relates to the image processing field, and in particular, to a system and method for image processing.

BACKGROUND

Augmented Reality (AR) is a technique which computes in real time a camera's position and direction and provides corresponding images. This technique is aimed to combine the virtual world with the actual world. It has been used more and more widely with the improvement of the computing capacity of electronic devices. Virtual Reality (VR) is a computer simulation system capable of creating and experiencing the virtual world, which uses a computer to generate a simulative environment. VR is a multi-source information fusion and interactive system which combines the three-dimension vision with a physical behavior, so that a user may immerse himself in the environment.

In most cases, when the augmented reality device and the virtual reality device are placed on the user's head, the user may not see the environment behind or the environment outside the device. When the user is in movement, for example, the user takes a standing and walking posture, and if there is an obstacle around, e.g., a building wall, safety problems may occur. Besides, sometimes in a scene where the user interacts with others or the contents in the virtual reality/augmented reality system, the user may need to achieve a certain action or to intervene in the user's actions, for instance to implicitly make the user turn around or to walk along an arc, so as to reach the goal of the application or the game. These effects cannot be achieved by current technologies.

SUMMARY

The present disclosure provides a system and method for image processing, which is capable of affecting and intervening in a user's behavior.

To solve the above-mentioned problem, one technical scheme adopted by the present disclosure is: providing an image processing system, which is utilized in a virtual reality system or an augmented reality system, including a motion detection module, a dynamic image processing module, an image display module and an intervention instruction module; the motion detection module is configured to detect and acquire actual motion information that a user applies on the virtual reality system or the augmented reality system, and to send the actual motion information to the dynamic image processing module; the intervention instruction module is configured to generate and activate an intervention instruction based on surrounding environment of the virtual reality system or the augmented reality system, or based on control information from a third party application and other service components in the image processing system, so as to intervene in the image processing process of the dynamic image processing module, wherein, the intervention instruction includes an intervention parameter offset value, the intervention parameter offset value is an intervention value used for computing image motion data in the dynamic image generating process; the dynamic image processing module is configured to receive the actual motion information sent by the motion detection module and the intervention instruction sent by the intervention instruction module, and to dynamically generate an image imposed with the intervention instruction based on the actual motion information and the intervention instruction, and to send the image imposed with the intervention instruction to the image display module; the image display module is configured to receive the image imposed with the intervention instruction sent by the dynamic image processing module and to display, so as to affect and intervene in the user's behavior.

In one embodiment, the intervention parameter offset value varies with a motion and the surrounding environment of the virtual reality system or the augmented reality system.

In one embodiment, the dynamic image processing module is specifically configured to analyze actual motion data along a specific direction in a specific plane during each image processing process, to generate a new image by imposing the intervention parameter offset value to the actual motion data when the actual motion data along the specific direction is a positive value, and to generate a new image with the actual motion data by a conventional image generating method when the actual motion data along the specific direction is a negative value or an unchanged value.

To solve the above-mentioned problem, another technical scheme adopted by the present disclosure is: providing an image processing system, which is utilized in a virtual reality system or an augmented reality system, including a motion detection module, a dynamic image processing module, an image display module and an intervention instruction module, wherein: the motion detection module is configured to detect and acquire actual motion information that a user applies on the virtual reality system or the augmented reality system, and to send the actual motion information to the dynamic image processing module; the intervention instruction module is configured to generate and activate an intervention instruction and to send the intervention instruction to the dynamic image processing module, so as to intervene in the image processing process of the dynamic image processing module; the dynamic image processing module is configured to receive the actual motion information sent by the motion detection module and the intervention instruction sent by the intervention instruction module, to dynamically generate an image imposed with the intervention instruction based on the actual motion information and the intervention instruction, and to send the image imposed with the intervention instruction to the image display module; the image display module is configured to receive the image imposed with the intervention instruction sent by the dynamic image processing module and to display, so as to affect and intervene in the user's behavior.

In one embodiment, the intervention instruction module is specifically configured to generate and activate an intervention instruction based on surrounding environment of the virtual reality system or the augmented reality system, or based on control information from a third party application and other service components in the image processing system, and to send the intervention instruction to the dynamic image processing module, so as to intervene in the image processing process of the dynamic image processing module.

In one embodiment, the intervention instruction includes an intervention parameter offset value. The intervention parameter offset value is an intervention value used for computing image motion data in the dynamic image generating process.

In one embodiment, the intervention parameter offset value varies with a motion and surrounding environment of the virtual reality system or the augmented reality system.

In one embodiment, the dynamic image processing module is specifically configured to analyze actual motion data along a specific direction in a specific plane during each image processing process, to generate a new image by imposing the intervention parameter offset value to the actual motion data when the actual motion data along the specific direction is a positive value, and to generate a new image with the actual motion data by a conventional image generating method when the actual motion data along the specific direction is a negative value or an unchanged value.

To solve the above-mentioned problem, one technical scheme adopted by the present disclosure is providing an image processing method, which is utilized in a virtual reality system or an augmented reality system, including: detecting and acquiring actual motion information that a user applies on the virtual reality system or the augmented reality system; dynamically generating an image imposed with an intervention instruction based on the actual motion information and the intervention instruction when receiving the intervention instruction; displaying the image imposed with an intervention instruction, so as to affect and intervene in the user's behavior.

In one embodiment, the method further includes: generating and activating an intervention instruction based on a surrounding environment of the virtual reality system or the augmented reality system, or based on control information from a third party application and other service components in the image processing system.

In one embodiment, the intervention instruction comprises an intervention parameter offset value, the intervention parameter offset value is an intervention value used for computing the image motion data in the dynamic image generating process.

In one embodiment, the intervention parameter offset value varies with a motion and surrounding environment of the virtual reality system or the augmented reality system.

In one embodiment, dynamically generating an image imposed with an intervention instruction based on the actual motion information and the intervention instruction includes: analyzing actual motion data along a specific direction in a specific plane during each image processing process; generating a new image by imposing the intervention parameter offset value to the actual motion data when the actual motion data along the specific direction is a positive value; and generating a new image with the actual motion data by a conventional image generating method when the actual motion data along the specific direction is a negative value or an unchanged value.

The motion detection module of the present disclosure is configured to detect and acquire the actual motion information that a user applies on the virtual reality device or the augmented reality system, and to send the actual motion information to the dynamic image processing module; the intervention instruction module is configured to generate and activate an intervention instruction and to send the intervention instruction to the dynamic image processing module so as to intervene in the image processing process of the dynamic image processing module; the dynamic image processing module is configured to receive the actual motion information sent by the motion detection module and the intervention instruction sent by the intervention instruction module, to dynamically generate an image imposed with the intervention instruction based on the actual motion information and the intervention instruction, and to send the image imposed with the intervention instruction to the image display module; the image display module is configured to receive the image imposed with the intervention instruction sent by the dynamic image processing module and to display, so as to affect and intervene user's behavior. The image generated by the dynamic image processing module is imposed with the intervention instruction, so that the image imposed with the intervention instruction may guide the user's behavior. Through this way, the user's behavior can be affected and intervened.

DETAILED DESCRIPTION

The disclosure will now be described in detail with reference to the accompanying drawings and examples.

Figure 1:
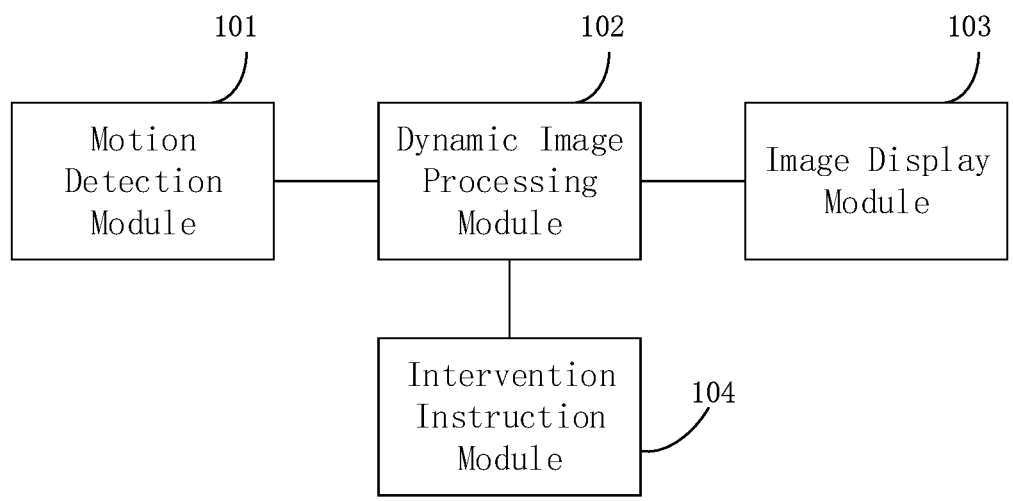
FIG. 1 is a schematic diagram of one embodiment of an image processing system of the present disclosure.

Referring to FIG. 1, a schematic diagram of one embodiment of an image processing system of the present disclosure is shown, the image processing system is utilized in a virtual reality system or an augmented reality system.

Augmented reality is a technique which combines the information of the real world and that of the virtual world. It uses scientific technologies such as computer science to simulate physical information (visual information, sound, taste, touch etc.) which is difficult to experience in a certain time range and space range in the real world, add these "virtual" information in the real world and make them perceived by human sense, so as to create a sensory experience beyond the reality. Real environment and virtual objects are put together in a same image or space in real time and exist at the same time. Augmented reality shows not only the real world's information but also the virtual information, these two kinds of information complement each other. In the visualization of augmented reality, a user may use a helmet display which shows the real world and computer graphics synthetically, so the user may see the real world around him in the helmet.

Virtual reality is an important research direction of simulation technology, it is a challenging frontier discipline which involves multiple technologies such as simulation technology, computer graphics, man-machine interface technology, multimedia technology, sensing technology and network technology, etc. Virtual reality mainly includes environment simulation, sensing, perception, natural skills and sensing equipment. Simulative environment comprises lifelike real-time three-dimension images generated by a computer. Perception means that an ideal virtual reality should include all human perceptions. Besides the visual information generated by computer graphic technology, it may also include other perceptions like auditory sense, tactile sense, force sense and motion sense, and even the smelling sense and taste sense, namely multimodal perception. Natural skills refer to the actions achieved by a human being, such as the motion of the eyes or head, gestures, and other human behavior. Computers may deal with the data related to the participant's actions and generate real-time response and provide feedback to the participant. Sensing equipment means three-dimension interactive equipment.

The image processing system may include a motion detection module 101, a dynamic image processing module 102, an image display module 103, and an intervention instruction module 104.

The motion detection module 101 may be configured to detect and acquire actual motion information that a user applies on the virtual reality system or the augmented reality system, and to send the actual motion information to the dynamic image processing module 102.

The motion detection module 101 may be set inside the virtual reality/augmented reality device, or in an accessory equipment, which can communicate with the virtual reality or augmented reality device. The user may take several actions when wearing the virtual reality or augmented reality device, such as turning around, shaking his head or walking towards a certain direction. The motion detection module 101 may be configured to detect and acquire the actual motion information that the user applies on the virtual reality or augmented reality device, and to send the information to the dynamic image processing module 102.

The intervention instruction module 104 may be configured to generate and activate an intervention instruction, and to send the intervention instruction to the dynamic image processing module 102, so as to intervene in the image processing process of the dynamic image processing module 102.

The intervention instruction may be an instruction intervening the user's behavior when needed, so as to lead the user's behavior to change a specific way. For instance, when the user is walking forward and cannot see in front of the user, it is necessary to guide the user to turn left or right in order to avoid, for example, a wall in front of him. At this time, the system may generate and activate the intervention instruction and send it to the dynamic image processing module 102 such that the dynamic image processing module 102 may take this instruction in consideration instead of using a conventional way and provide new treatments when processing images.

The dynamic image processing module 102 is configured to receive the actual motion information sent by the motion detection module 101 and the intervention instruction sent by the intervention instruction module 104, to dynamically generate an image imposed with the intervention instruction based on the actual motion information and the intervention information, and to send the image imposed with the intervention instruction to the image display module 103.

The dynamic image processing module 102 may take the intervention instruction in consideration during the image processing process after having received the actual motion information and the intervention instruction. In other words, the dynamic image processing module introduces the intervention instruction when dealing with the actual motion related image, generates an image imposed with the intervention instruction, and sends the image imposed with the intervention instruction to the image display module 103.

The image display module 103 may be configured to receive the image imposed with the intervention instruction sent by the dynamic image processing module 102 and to display, so as to affect and intervene the user's behavior.

The image display module 103 may display the image imposed with the intervention instruction. When seeing the display, the user may change his behavior according to the image's guide, so that the user's behavior may be affected and intervened.

In the embodiment of the present disclosure, the motion detection module may be configured to detect and acquire the actual motion information that a user applies on the virtual reality device or the augmented reality system, and to send the actual motion information to the dynamic image processing module; the intervention instruction module may be configured to generate and activate an intervention instruction and to send the intervention instruction to the dynamic image processing module so as to intervene in the image processing process of the dynamic image processing module; the dynamic image processing module may be configured to receive the actual motion information sent by the motion detection module and the intervention instruction sent by the intervention instruction module, to dynamically generate an image imposed with the intervention instruction based on the actual motion information and the intervention instruction, and to send the image imposed with the intervention instruction to the image display module; the image display module is configured to receive the image imposed with the intervention instruction sent by the dynamic image processing module and to display, so as to affect and intervene in the user's behavior. The image generated by the dynamic image processing module is imposed with the intervention instruction, so that the image imposed with the intervention instruction may guide user's behavior. Through this way, user's behavior can be affected and intervened.

In one embodiment, the intervention instruction module 104 may be specifically configured to generate and activate an intervention instruction based on surrounding environment of the virtual reality system or the augmented reality system, or based on control information from a third party application and other service components in the image processing system so as to intervene in the image processing process of the dynamic image processing module.

The image processing process of virtual reality or augmented reality will be described below.

Most of the techniques and applications based on virtual reality or augmented reality are designed to be an image processing and displaying system which takes the user's center line as center axis. Whether using a cylindrical coordinate system or a spherical coordinate system, the image processing and displaying process should be activated by a parameter. The parameter is a motion parameter of one or multiple dimensions acquired in 3-dimension space by the virtual reality or augmented reality device or its accessory equipment. For example, in the horizontal dimension, the device acquires the direction and distance in which the device moves in the horizontal space. Then the image processing unit of the virtual reality or augmented reality device performs data calculations and adjustments based on the scene design, image data, and control instructions, while taking the user's viewpoint as the center, so as to regenerate all or part of the image. Therefore, the user may see the new image corresponding to his movement. The image processing and generating method is a proven technique and will not be described in detail hereon.

In one embodiment, the intervention instruction may include an intervention parameter offset value. The intervention parameter offset value is an intervention value used for computing image motion data in the dynamic image generating process.

In one embodiment, the intervention parameter offset value may have two forms. One is an absolute vale which may be added directly to the input motion data. And the other is a percentage which may be added to the input motion data. Regardless of its form, the intervention parameter offset value may keep unchanged from the activation and the stop of intervention function. The offset value may be positive or negative.

In one embodiment, the intervention parameter offset value may vary with motion and the surrounding environment of the virtual reality or augmented reality system.

In one embodiment, when the dynamic image processing module 102 is about to process and update the image when having received the actual motion update information from the motion detection module 101, the dynamic image processing module 102 may determine whether it has received a new instruction from the intervention module 104 since the last operation. If yes, the dynamic image processing module 102 performs the activation, stop, or update of the intervention parameter offset value according to the intervention instruction.

When receiving an intervention demand from the virtual reality or augmented reality system or a backend system, the intervention instruction module 104 may inform the image processing system to enable the intervention function along a specific direction in a specific plane, and to activate the preset intervention parameter offset value or an intervention parameter offset from other systems.

After having enabled the intervention function, the dynamic image processing module 102 may analyze actual motion data along a specific direction in a specific plane during each image processing process. When the actual motion data along the specific direction is a positive value, the dynamic image processing module 102 generates a new image by imposing the intervention parameter offset value to the actual motion data. When the actual motion data along the specific direction is a negative value or an unchanged value, the dynamic image processing module 102 generates a new image with the actual motion data by a conventional image generating method.

When the intervention instruction is an intervention stop instruction, the dynamic image processing module 102 disables the intervention function, resets the intervention parameter offset value to zero, and uses conventional image generating method to generate images in subsequent image processing.

With the treatments set forth above, the virtual reality or augmented reality device may lead the user to move along a certain direction by implementing a deflection of the image display along the direction. For instance, in the case that a user wears a headset game goggle, when there is a pillar in front of the user, it is necessary to lead the user to move to the right according to scene design or safety design of the device so as to avoid the pillar. At this time, the device may activate a negative intervention to the motion data towards the right, therefore each time when the user moves to the right, the image deflection range will be less than the range when the user moves to the left, and the difference is equal to the intervention parameter offset value. In other words, the image will move more in the case that the user moves or turns his head to the left than in the case that the user moves or turns his head to the right. After several movements, the field of view of the user has been moved to the left, therefore it becomes less easy for the user to see the same scene of the beginning if he does not move. Consequently, the user may turn right to adjust his field of view and find the scene of the beginning, and the intervention function is completed. For another example, when a scene can provide safety related information, the device may enable a positive intervention to the motion data towards the scene. Therefore, the user's movement towards the scene may be accumulated and it is more possible for the user to see the safety related information and to take actions.

Figure 2:
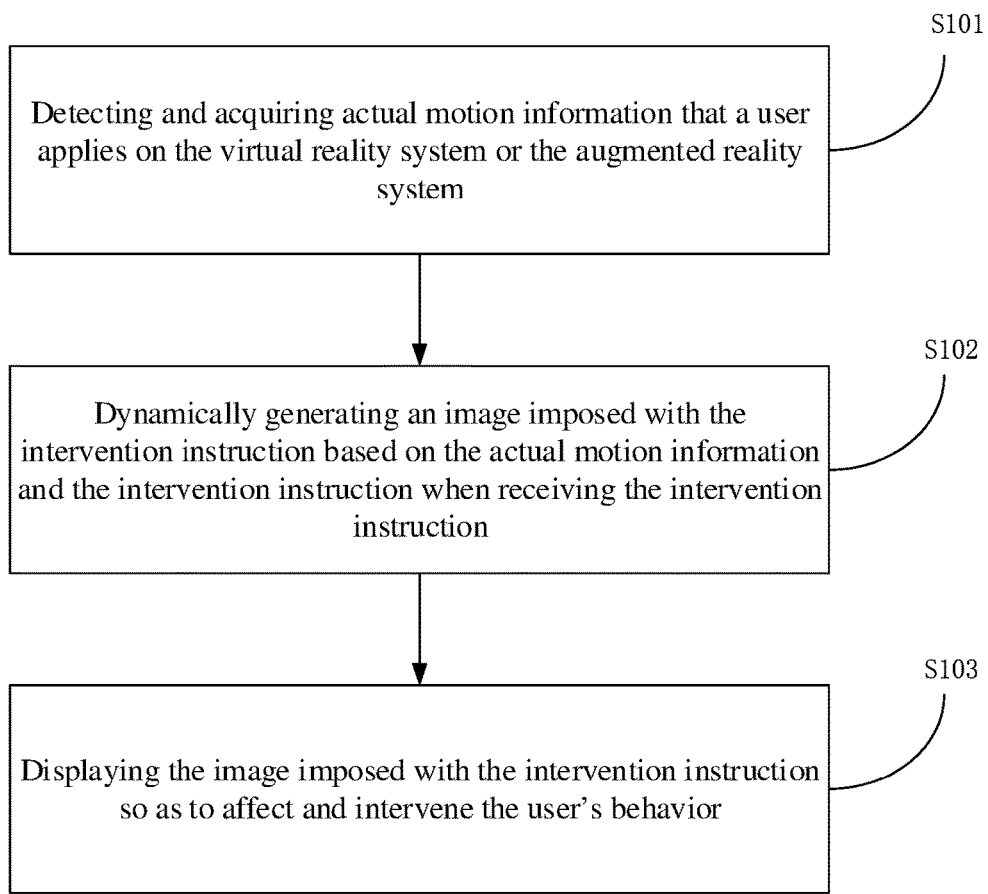
FIG. 2 is a flow chart of one embodiment of an image processing method of the present disclosure.

Referring to FIG. 2, a flow chat of one embodiment of an image processing method of the present disclosure is shown, the method may be implemented by the system set forth above. Relative information can be found above and will not be described hereon. The method is utilized in a virtual reality system or an augmented reality system, including:

S101: detecting and acquiring actual motion information that a user applies on the virtual reality system or the augmented reality system.

S102: dynamically generating an image imposed with an intervention instruction based on the actual motion information and the intervention instruction when receiving the intervention instruction.

S103: displaying the image imposed with the intervention instruction, so as to affect and intervene the user's behavior.

The implementation of the present disclosure detects and acquires actual motion information that a user applies on the virtual reality system or the augmented reality system; dynamically generates an image imposed with an intervention instruction based on the actual motion information and the intervention instruction when receiving the intervention instruction; and displays the image imposed with the intervention instruction, so as to affect and intervene the user's behavior. Because of the introduction of the intervention instruction during the image generation, the image imposed with the intervention instruction when displayed may guide the user's behavior. Through this way, the user's behavior may be affected and intervened.

The method may further include: generating and activating an intervention instruction based on surrounding environment of the virtual reality system or the augmented reality system, or based on control information from a third party application and other service components in the image processing system.

The intervention instruction may include an intervention parameter offset value, the intervention parameter offset value is an intervention value used for the compute of image motion data in the dynamic image generating process.

The intervention parameter offset value may vary with a motion and the surrounding environment of the virtual reality system or the augmented reality system.

In one embodiment, the block S102 may specifically include: analyzing actual motion data along a specific direction in a specific plane during each image processing process; generating a new image by imposing the intervention parameter offset value to the actual motion data when the actual motion data along the specific direction is a positive value; and generating a new image with the actual motion data by a conventional image generating method when the actual motion data along the specific direction is a negative value or an unchanged value.

Figure 3:
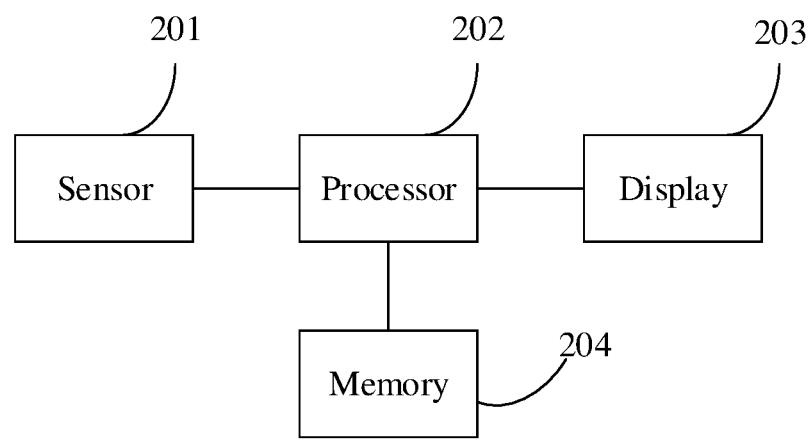
FIG. 3 is a schematic diagram of one embodiment of a specific device of an image processing system of the present disclosure.

FIG. 3 is a schematic diagram of one embodiment of a specific device of an image processing system of the present disclosure. The specific device is capable of executing the blocks as set forth above, information of which can be found in the above-mentioned method and will not be described hereon.

The specific device may include: a motion sensor 201, a memory 202 coupled with the processor 203, and a display 204.

The sensor 11 may be configured to detect and acquire actual motion information that a user applies on the virtual reality system or the augmented reality system, and to send the actual motion information to the processor 203.

The memory 202 may be configured to store program instructions. The program instructions may be executed by the processor 203.

The processor 203 may be configured to dynamically generate an image imposed with an intervention instruction based on the actual motion information and the intervention instruction.

The display 204 may be configured to display the image imposed with the intervention instruction, so as to affect and intervene in the user's behavior.

In one embodiment, the processor 203 may be further configured to generate and activate an intervention instruction based on surrounding environment of the virtual reality system or the augmented reality system, or based on control information from a third party application and other service components in the image processing system.

The intervention instruction may include an intervention parameter offset value, the intervention parameter offset value is an intervention value used for computing image motion data in the dynamic image generating process.

The intervention parameter offset value may vary with a motion and surrounding environment of the virtual reality system or the augmented reality system.

In one embodiment, the processor 203 dynamically generates an image imposed with an intervention instruction based on the actual motion information and the intervention instruction may refer to: analyzing actual motion data along a specific direction in a specific plane during each image processing process; generating a new image by imposing the intervention parameter offset value to the actual motion data when the actual motion data along the specific direction is a positive value; and generating a new image with the actual motion data by a conventional image generating method when the actual motion data along the specific direction is a negative value or unchanged value.

It is to be understood that, the methods disclosed in the embodiments of the present disclosure may be implemented in the form of software functional units and utilized and sold independently. The above-mentioned modules may be stored in the ROM of a computing device. Based on this comprehension, the parts which contribute to the embodiments of the present disclosure may be implemented in the form of software product, and the software product may be stored in a storage medium including several instructions which is configured to execute all or part of the blocks described in the above-mentioned embodiments of the present disclosure on a virtual reality or augmented reality device or on a processor. The above-mentioned storage medium may include: USB flash disk, mobile HDD, ROM, RAM, disk or any medium used for storing program code.

The above-described embodiments are intended to illustrate rather than limit the present disclosure. Equivalent structure or equivalent process transformation based on the specification of the disclosure are likewise included within the scope of patent protection of the present disclosure, either utilized directly or indirectly in the relative technical field.

What is claimed is:

1. An image processing method, wherein, the method is utilized in a virtual reality system or an augmented reality system, comprising:
   detecting and acquiring actual motion information that a user applies on the virtual reality system or the augmented reality system;
   dynamically generating an image imposed with an intervention instruction based on the actual motion information and the intervention instruction when receiving the intervention instruction;
   displaying the image imposed with the intervention instruction, so as to affect and intervene a behavior of the user;
   wherein the intervention instruction comprises an intervention parameter offset value, the intervention parameter offset value is an intervention value used for computing image motion data in the dynamic image generating process;
   the intervention parameter offset value varies with a motion and surrounding environment of the virtual reality system or the augmented reality system; and
   the dynamically generating the image imposed with the intervention instruction based on the actual motion information and the intervention instruction comprises:
   analyzing actual motion data along a specific direction in a specific plane during each image processing process;
   generating a new image by imposing the intervention parameter offset value to the actual motion data when the actual motion data along the specific direction is a positive value; and
   generating a new image with the actual motion data by a conventional image generating method when the actual motion data along the specific direction is a negative value or null.

2. The method of claim 1, further comprising:
   generating and activating an intervention instruction based on surrounding environment of the virtual reality system or the augmented reality system, or based on control information from a third party application and other service components in the system.

3. An image processing system, which is utilized in a virtual reality system or an augmented reality system, comprising a motion sensor, a memory, a processor and a display, wherein:
   the motion sensor is configured to detect and acquire actual motion information that a user applies on the virtual reality system or the augmented reality system, and to send the actual motion information to the processor;
   the memory is configured to store program instructions, the program instructions are executed by the processor;
   the processor is configured to dynamically generate an image imposed with an intervention instruction based on the actual motion information and the intervention instruction;
   the display is configured to display the image imposed with the intervention instruction, so as to affect and intervene a behavior of the user;
   the intervention instruction comprises an intervention parameter offset value, the intervention parameter offset value is an intervention value used for computing image motion data in the image generating process;
   the intervention parameter offset value varies with a motion and surrounding environment of the virtual reality system or the augmented reality system; and
   a method by which the processor dynamically generates the image imposed with the intervention instruction based on the actual motion information and the intervention instruction comprises:

analyzing actual motion data along a specific direction in a specific plane during each image processing process;

generating a new image by imposing the intervention parameter offset value to the actual motion data when the actual motion data along the specific direction is a positive value; and generating a new image with the actual motion data by a conventional image generating method when the actual motion data along the specific direction is a negative value or null.

4. The system of claim 3, wherein the processor is further configured to generate and activate an intervention instruction based on surrounding environment of the virtual reality system or the augmented reality system, or based on control information from a third party application and other service components in the image processing system.

5. A non-transitory readable medium comprising program instructions that, when executed by a processor, cause the processor to perform an image processing method for a virtual reality system or an augmented reality system, the method comprises:

detecting and acquiring actual motion information that a user applies on the virtual reality system or the augmented reality system;

dynamically generating an image imposed with an intervention instruction based on the actual motion information and the intervention instruction when receiving the intervention instruction;

displaying the image imposed with the intervention instruction, so as to affect and intervene a behavior of the user;

wherein the intervention instruction comprises an intervention parameter offset value, the intervention parameter offset value is an intervention value used for computing image motion data in the dynamic image generating process;

the intervention parameter offset value varies with a motion and surrounding environment of the virtual reality system or the augmented reality system; and the dynamically generating an image imposed with an intervention instruction based on the actual motion information and the intervention instruction comprises:

analyzing actual motion data along a specific direction in a specific plane during each image processing process;

generating a new image by imposing the intervention parameter offset value to the actual motion data when the actual motion data along the specific direction is a positive value; and generating a new image with the actual motion data by a conventional image generating method when the actual motion data along the specific direction is a negative value or null.

6. The non-transitory readable medium of claim 5, wherein the method further comprises:

generating and activating an intervention instruction based on surrounding environment of the virtual reality system or the augmented reality system, or based on control information from a third party application and other service components in the image processing system.

* * * * *